(12) United States Patent
Johnson

(10) Patent No.: US 8,074,093 B1
(45) Date of Patent: Dec. 6, 2011

(54) METHOD AND SYSTEM FOR OPTIMIZING THE COMPLETION OF COMPUTING OPERATIONS

(76) Inventor: Daniel L. Johnson, Jonesboro, AR (US)

( * ) Notice: Subject to any disclaimer, the term of this patent is extended or adjusted under 35 U.S.C. 154(b) by 0 days.

(21) Appl. No.: 13/153,278

(22) Filed: Jun. 3, 2011

(51) Int. Cl.
*G06F 1/28* (2006.01)

(52) U.S. Cl. ........ 713/322; 713/300; 713/320; 713/501; 713/502; 713/600; 717/151; 718/100

(58) Field of Classification Search ........... 713/300, 713/320, 322, 501, 502, 600; 717/151; 718/100
See application file for complete search history.

(56) References Cited

U.S. PATENT DOCUMENTS

| | | | |
|---|---|---|---|
| 5,630,110 A * | 5/1997 | Mote, Jr. .................. | 713/501 |
| 6,442,700 B1 | 8/2002 | Cooper | |
| 6,845,456 B1 | 1/2005 | Menezes et al. | |
| 6,895,520 B1 | 5/2005 | Altmejd et al. | |
| 7,039,817 B2 * | 5/2006 | Burnham et al. ............ | 713/320 |
| 7,254,721 B1 | 8/2007 | Tobias et al. | |
| 7,260,728 B2 | 8/2007 | Chang | |
| 7,340,622 B2 | 3/2008 | Cox | |
| 7,376,848 B2 * | 5/2008 | Beard ...................... | 713/320 |
| 7,469,355 B1 | 12/2008 | Chong | |
| 7,647,513 B2 | 1/2010 | Tobias et al. | |
| 2005/0024927 A1 * | 2/2005 | Dolwin ..................... | 365/154 |
| 2006/0161375 A1 | 7/2006 | Duberstein | |

* cited by examiner

*Primary Examiner* — Thuan Du
(74) *Attorney, Agent, or Firm* — Joe D. Calhoun; Rashauna A. Norment

(57) ABSTRACT

Computer software that manages the amount of power provided to a processing unit for a specific process task, optimizing the processing speed of that specific task without overheating the processing unit. In the optimization method, the software initially counts the number of operations completed during an initial subtask duration for the current process task, then recounts the number of operations completed during a repeat subtask duration when the voltage to the processing unit was increased incrementally based on its die size. The software then determines whether to (a) repeat such steps until the operations count stops increasing (and save the completed-operations count of that subtask duration), or (b) whenever the temperature of the processing unit exceeds a failsafe temperature, save the completed-operations count of the immediately preceding subtask duration. The task may be processed continuously at that optimized performance level and power level.

19 Claims, 2 Drawing Sheets

METHOD AND SYSTEM FOR OPTIMIZING THE COMPLETION OF COMPUTING OPERATIONS

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present invention generally relates to computer software that manages the amount of voltage provided to a processing unit for optimizing the completion of computing tasks. More particularly, the present invention includes a program that determines the amount of voltage supply to a processing unit that will result in the highest number of completed operations for a task, without overheating the processing unit; that power level and operations count is then stored in association with an identifier unique to that task, to enable the operating system to provide that power level for the next processing of that task.

In general, a computer's operating system manages the software and hardware resources of the computer, and directs each Process (or application) to a processing unit for execution of its instructions in the sequence specified. Each program codes for one or more tasks, each of which may include one or more separate operations that may need to be completed en route to completion of the task or program. The operating system typically assigns each task a unique process identifier ("PID"), and assigns a processing unit to execute the Process code directing performance of each task; this execution is generally known as processing.

The operating system typically places each task into a scheduling queue until a processing unit is available to process the task. A processing unit may take the form of a single central processing unit ("CPU"), or functional subunits on that CPU sometimes called the processing "cores". Besides the multi-core processing arrangements, computers may also contain multiple CPUs, each of which may include multiple functional subunits or cores.

Input or output data or other information associated with a Process and/or its task(s) (and/or a processing unit) may be stored in a memory structure, associated with a processing unit and/or peripheral devices. For most programs not requiring a great amount of time or memory for execution, input data needed for a task is stored in local cache memory, readily available to the processing unit assigned that task. Examples of such stored data include variables for the program, pointer locations and data structures (such as a data array).

Some computers such as laptops, desktops or mobile devices typically process mostly short or relatively simple tasks. Other computers are designed to process time-intensive, high-volume tasks; for example, the tasks required for some computations involved in genetic sequencing or atomic energy modeling may require the accessing and/or manipulation of large database collections, such as the cross referencing large data tables or the computation of complex mathematical calculations. Some programs or tasks may take hours, days or even weeks to process.

Generally, the typical personal computer is not programmed to process a program or task at its optimal performance level; rather, personal computers typically are programmed by manufacturers to maintain a lower, default level of readiness expected to satisfy the energy and processing needs of the typical user. This may be due to recognition that the execution of many common programs by personal computing devices (such as laptops, desktop workstations and mobile devices) requires only a relatively small amount of computing time, power and resources. Moreover, the limited amount of energy available to laptops and mobile devices (remote from an electrical outlet) often requires that the default level of power and performance be set at a relatively low level. Maintaining processing readiness and performance at a maximum level will unnecessarily drain the battery, while processing a task continuously at a maximum performance level may increase the temperature of the processing unit to a point that it may cause damage to the processing unit. Therefore, a manufacturer generally sets a default power level for a processing unit corresponding to a performance level for a task that may be substantially below the task's optimal performance level.

It is important that the maximum recommended processor temperature not be exceeded, to prevent damaging or destroying the processor chip. Some previous solutions for increasing performance were to decrease the processor chip die size so that it processed faster without increasing power consumption or heat. Still, the problem remained with processing a task at its optimal performance level. Although the task may be processed continuously or temporarily at any given performance level, the processing unit temperature reading should be still monitored. Increasing the power provided to the processing unit can be accomplished without compromising the processor chip.

Increasing processor performance may be accomplished by increasing its "clock frequency" and/or its voltage supply. The clock frequency and operating voltage are directly proportional to power consumption and processing unit temperature. However, since increasing voltage also decreases battery life in devices relying upon battery power, consumer-computing industry focus has often been on supplying only the minimal amount of power needed to accomplish the consumer-computing processing fast enough to be acceptable to the average consumer. Some solutions involve decreasing power consumption of a processor for execution of short or uncomplicated tasks, even if doing so would not result in optimal performance of the task. These systems typically seek to conserve battery charge for a mobile device, such as a laptop, or to increase power consumption only for temporary maximum performance. They do not teach or suggest incrementally increasing power (based on processor die size) for a specific task, for a subtask duration, until optimal processing performance has been achieved. Nor do they teach or suggest such a system that also monitors processing unit temperature to maintain a temperature at or below a failsafe temperature.

There is a need for incrementally increasing the processing unit voltage until optimal performance of a task is achieved, without exceeding a failsafe temperature. A need also exists for software that can count the number of operations completed during a subtask duration for a current task, increase the voltage to the processing unit incrementally based upon its die size until the most recent count stops exceeding the weighted average of the previous counts, and save the count of that subtask. A need exists for software that can determine whenever the temperature of a processing unit exceeds a failsafe temperature, and that can save the count of the immediately preceding subtask.

(2) Description of Related Art Including Information Disclosed 37 CFR 1.97 and 1.98.

The following patents are arguably material to the patentability of the invention disclosed herein:

| U.S. patent/application No. | 1st Named Inventor | Date of Patent/ Publication |
|---|---|---|
| 6,442,700 | Cooper | 27 Aug. 2002 |
| 6,845,456 | Menezes | 18 Jan. 2005 |
| 6,895,520 | Altmejd | 17 May 2005 |
| 20060161375 | Duberstein | 20 Jul. 2006 |
| 7,254,721 | Tobias | 7 Aug. 2007 |
| 7,260,728 | Chang | 21 Aug. 2007 |
| 7,340,622 | Cox | 4 Mar. 2008 |
| 7,469,355 | Chong | 23 Dec. 2008 |
| 7,647,513 | Tobias | 12 Jan. 2010 |

U.S. Pat. No. 7,340,622 issued to Cox et al (the "Cox patent") discloses a method and apparatus for selectively increasing the operating speed of an electronic circuit, essentially by sequentially increasing the clock speed for the circuit and the voltage supply to it, beginning from a "low" (sub-default) combination of clock speed and voltage yielding sub-default electrical consumption and operating frequency. When the circuit starts to perform computational work, a timer causes the computer to operate at the low level for a pre-set duration (10 ms for example), then the program increases both the voltage and frequency for another pre-set duration (10 ms for example). The computer then increases the voltage and frequency to the maximum sustainable levels (default, or manufacturer recommended) for a pre-set duration (10 ms for example); if the circuit temperature is above a threshold value, the circuit remains in that maximum sustainable voltage and frequency state. If the temperature is below that threshold value, the computer boosts the frequency and voltage above the maximum sustainable state for pre-set duration (40 ms for example), to recover the computational work "lost" in the preceding low-power states. If the temperature ever exceeds the threshold value, the circuit returns to the maximum sustainable frequency and voltage state.

The overall context of the Cox patent is to minimize consumption of electricity while the computer is in "idle" state and during the beginning of processing new tasks, facilitating energy-saving completion of processing requiring only sub-default power during short bursts of activity. Given the emphasis upon balancing circuit performance and power savings (and the fact that the patent is owned by Apple, Inc.), it can be inferred that the program or method of the Cox patent has utility in smaller, battery powered devices. Where power supply is not an issue, there is no need to balance circuit performance and power savings.

U.S. Pat. No. 6,895,520 issued to Altmejd et al (the "Altmejd patent") discloses performance and power optimization through monitoring of utilization information feedback from each "functional block" of the computer, to reduce overall power consumption without unduly decreasing performance. This patent discloses a computer program that periodically (frequently) adjusts power consumption levels of the functional blocks to match respective block utilization levels according to block utilization information. The program tracks utilization information for each of the functional blocks on a task basis; when switching from a first task to a second task, the program adjusts power management parameters for one or more functional blocks according to utilization information corresponding to the second task. The operating system creates a power management profile (clock rate, voltage and dispatch rate) matching a desired performance level for each functional block for a plurality of tasks. When the operating system switches the processor to execute a different task, the power management controller sets the appropriate power management parameters to correspond to the particular task.

The overall concern of the Altmejd patent appears to be to quit diverting power to under-utilized functional units, while routing extra electricity to functional units being utilized more. Those parameters can be further adjusted during task execution to further improve power management. The utilization information may include a percentage of time that the block is used (or idle), such as might be calculated from the number of instructions dispatched to an execution unit over a predetermined period of time. The software periodically determines whether the power consumption (and performance) of the functional unit matches its load (utilization), then adjusts clock frequency, voltage and/or dispatch rate. The overall scheme appears to be to either increase power consumption and performance when the processing unit is (very recently was) busier than the default setting (upper utilization threshold), or decrease the power supply to (and performance readiness of) a processing unit that has recently experienced sub-default-level utilization (below a lower utilization threshold). Voltage may be increased in fixed steps, such as to match the clock speed of the functional unit.

U.S. Pat. Nos. 7,254,721 and 7,647,513 issued to Tobias et al. (the "Tobias patents") disclose a system for controlling a circuit to enter a predetermined performance state (voltage/frequency pairs) by skipping intermediate states based on the determined utilization of the circuit. These patents disclose a computer that periodically determines processor utilization and increases voltage and/or frequency if it is above a pre-set high threshold, or decreases voltage and/or frequency if it is below a pre-set low threshold. Any stepwise adjustment of the voltage/frequency is calibrated according to CPU utilization, in relation to the pre-set high and low thresholds. In determining CPU utilization, the program queries the operating system periodically for an enumeration of the tasks that are running (including operating system tasks), and obtains execution statistics for each task (such as the time each task spends executing, and any priority level). For each task, the operating system provides the cumulative amount of CPU time used since task initiation. Such sampling may span several subtask durations, disclosed to be less than 100 milliseconds. Averaging of utilization information for multiple samplings may be performed to "level off" changes of performance setting, if fluctuation is undesirable. The program then creates a utilization index for comparison to the high and low thresholds. Voltage is increase on a CPU-wide basis, rather than to each processing unit or on a per-task basis. The value of obtaining per-task information is primarily to exclude unimportant tasks from the equation (or averaging), or to downgrade or delay their processing.

Like the Cox patent, it can perhaps be inferred that both the Tobias patents and the Altmejd patent have most utility in smaller, battery powered devices, or in a computing environment dominated by multitasking of a short or "bursty nature". (Tobias patents, column 5 line 10.)

U.S. Pat. No. 6,442,700 issued to Chang et al. (the "Chang patent") discloses a windows-based power management method for optimally distributing power for various tasks in a portable device. The method includes categorizing each task to be executed, prescribing a power management policy for the portable device, and distributing shares of electricity among the tasks based on the task category; then, in response to GUI input commands from users, increasing power to that task running within an active window of the portable device. The Chang patent essentially re-prioritizes previously prioritized tasks in a queue, by moving user-interactive tasks (in an active window) to the immediate attention of the processing unit while delaying processing of other tasks deemed less important at the time (such as those of batch programs).

U.S. Pat. No. 7,469,355 issued to Chong discloses a system for dynamically overclocking a processor by monitoring an activity measure for a specific operation (such as a count of instruction or data cache accesses by the CPU), evaluating that measure to determine whether it meets a pre-defined level of processor activity, and (if so) dynamically adjusting the clock rate of the processor to modify the execution speed at which the processor carries out instructions. Evaluation of an activity measure may include combining it with a durational measure (such as a count of executed clock cycles) to produce a ratio, and determining whether the ratio has reached a pre-defined level. The clock rate may be adjustable to a plurality of predefined clock rates, based on evaluation of the activity measure. For example, if the activity measure is above a high threshold, indicating that the processor is very active, the system may increase the clock rate of the circuitry to a higher pre-set speed, to allow the CPU to operate at a greater speed until a temperature threshold is exceeded. Conversely, if the activity measure is below a low threshold, indicating that the processor has experienced a low level of activity, the system may decrease the clock rate or return it to a nominal rate such as the manufacturer suggested clock rate.

U.S. Pat. No. 6,442,700 issued to Cooper (the "Cooper patent") discloses thermal control within computer systems having multiple CPU performance states, wherein the computer initially executes user threads (multiple tasks) while in a high performance state (fastest processing possible for the power supply and thermal cooling capabilities) and, when a pre-set thermal threshold is exceeded, the processor transitions to a low power state (to conserve power and reduce heat) and executes user threads until it determines that it is below the thermal threshold so that a transition to a high performance state is possible. The shift between performance states may be as a function of voltage level supplied to the processor.

Published U.S. patent application Ser. No. 11/026,838 issued to Duberstein et al (Publication No. 2006/0161375, "Duberstein") discloses a method of optimizing processing speed base on temperature, by comparing a first processing core temperature to a first threshold and to a second threshold temperature, then comparing a second processor core temperature to the first and second thresholds. If the temperature of either core is below the first threshold, Duberstein increases the speed of that core.

None of the cited patents disclose determining whether the current task PID matches that of a previously-optimized task PID and counting the number of operations completed during a subtask duration, and if no match is found, (1) increasing the voltage to the processing unit by an increment dependent upon its die size and counting the number of operations completed during a subsequent subtask duration, then (2) determining whether the complete-operations count for the subsequent subtask duration exceeds that of the immediately preceding subtask duration so that further repetition of (1) and (2) may further optimize the completion of computing operations, or alternatively determining whether the most recent count does not exceed the previous count (or average or weighted score of previous counts) so that the voltage level and completed-operations count of the most recent subtask duration should be saved in association with its task PID. Moreover, none of the cited patents disclose, if a matching PID is found, (A) counting the number of operations completed during the subtask duration at the voltage level associated with the matching PID and (B) determining whether the completed-operations count is equal to that associated with the matching task identifier so that processing will continue at said voltage supply level, or alternatively determining whether the completed-operations count is equal to that associated with the matching task identifier so that further repetition of (1) and (2) may further optimize the completion of computing operations.

BRIEF SUMMARY OF THE INVENTION

Although the present invention has several embodiments, one version described is a system for optimizing the completion of computing operations by a processing unit, to achieve optimal performance of the processing of each respective task. One embodiment of the system comprises (includes):

1. a means of reviewing an operating system queue for a PID and comparing a current task PID to task PIDs stored in a data array for previously optimized tasks;

2. if the task has not been previously optimized (i.e., no matching PID in the data array), allowing the operating system to supply the default level of power to the processing unit, and counting the number of operations completed during a subtask duration of the current task;

3. if the completed-operations count of the most recent subtask duration exceeds that of the immediately preceding subtask duration, a means of directing the operating system to increase power provided to the processing unit, counting the number of operations completed during a new subtask, and comparing the completed-operations count of the most recent subtask duration against that of the immediately preceding subtask duration;

4. a means of repeating the previous processing until the completed-operations count for the most recent subtask duration no longer exceeds that of the immediately preceding subtask duration, or until the temperature of the processing unit exceeds a failsafe temperature; and 5. a means of storing the task PID in a data array for previously optimized tasks, in association with the voltage level and completed-operations count for the most recent subtask duration that no longer exceeded that of the immediately preceding subtask duration without exceeding the failsafe temperature.

In particular, the invention is essentially a computer software program that manages and optimizes the completion of task operations by adjusting the voltage provided to a processing unit during the processing of each task; the optimizer facilitates a process that determines the optimal amount of voltage to be directed by the operating system for the processing of each task. Generally, the optimizer either confirms that a task with a unique PID has been optimized previously (and directs the operating system to supply that optimal voltage to the processing unit for the task) or, if not already done, incrementally increases the voltage provided to the processing unit in order to increase the completion of operations without exceeding the failsafe temperature (before overheating the processing unit). If the processing unit temperature exceeds the failsafe temperature during an optimization cycle, the optimal voltage level for that particular task is set at the highest voltage tested prior to exceeding the failsafe temperature.

One primary object of the present invention is to provide a system for managing and optimizing the completion of processing operations by a processing unit when processing a specific task, to the highest operations completion level without exceeding a failsafe temperature.

Another primary object of the present invention is to provide a system for optimizing the processing of time-intensive, high-volume data of a specific task, by using a subtask interval of time for sampling completed-operations counts at increasing voltage provided to the processing unit, without exceeding a failsafe temperature.

Another primary object of the present invention is to provide a system having the ability to store task PIDs in a data array, in association with an optimal voltage and completed-operations count.

Other objects will be apparent from a reading of the written description disclosed herein, together with the claims.

Figure 1:
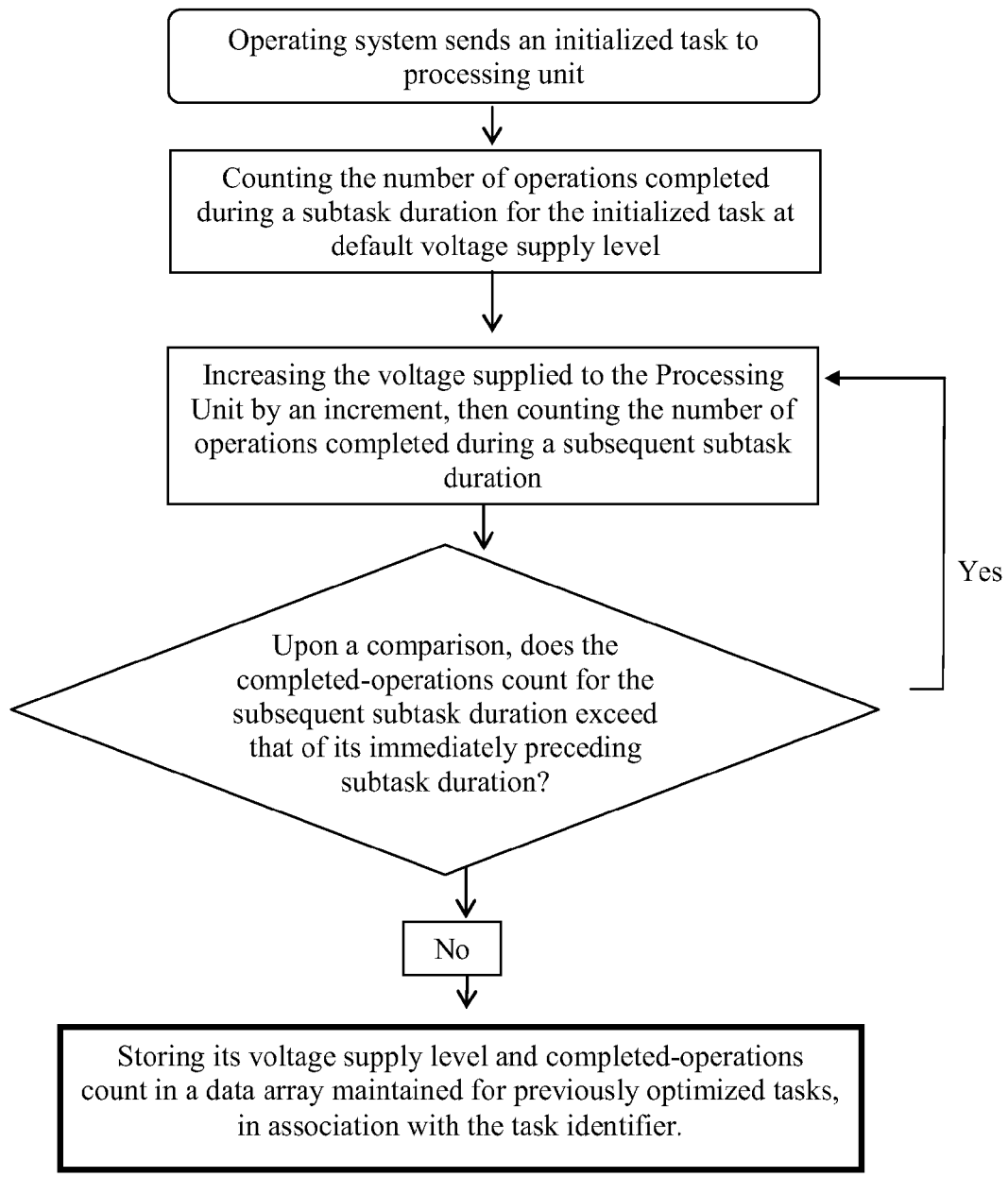
FIG. 1 depicts a logic flow diagram of one version of the program decisionmaking.
Figure 2:
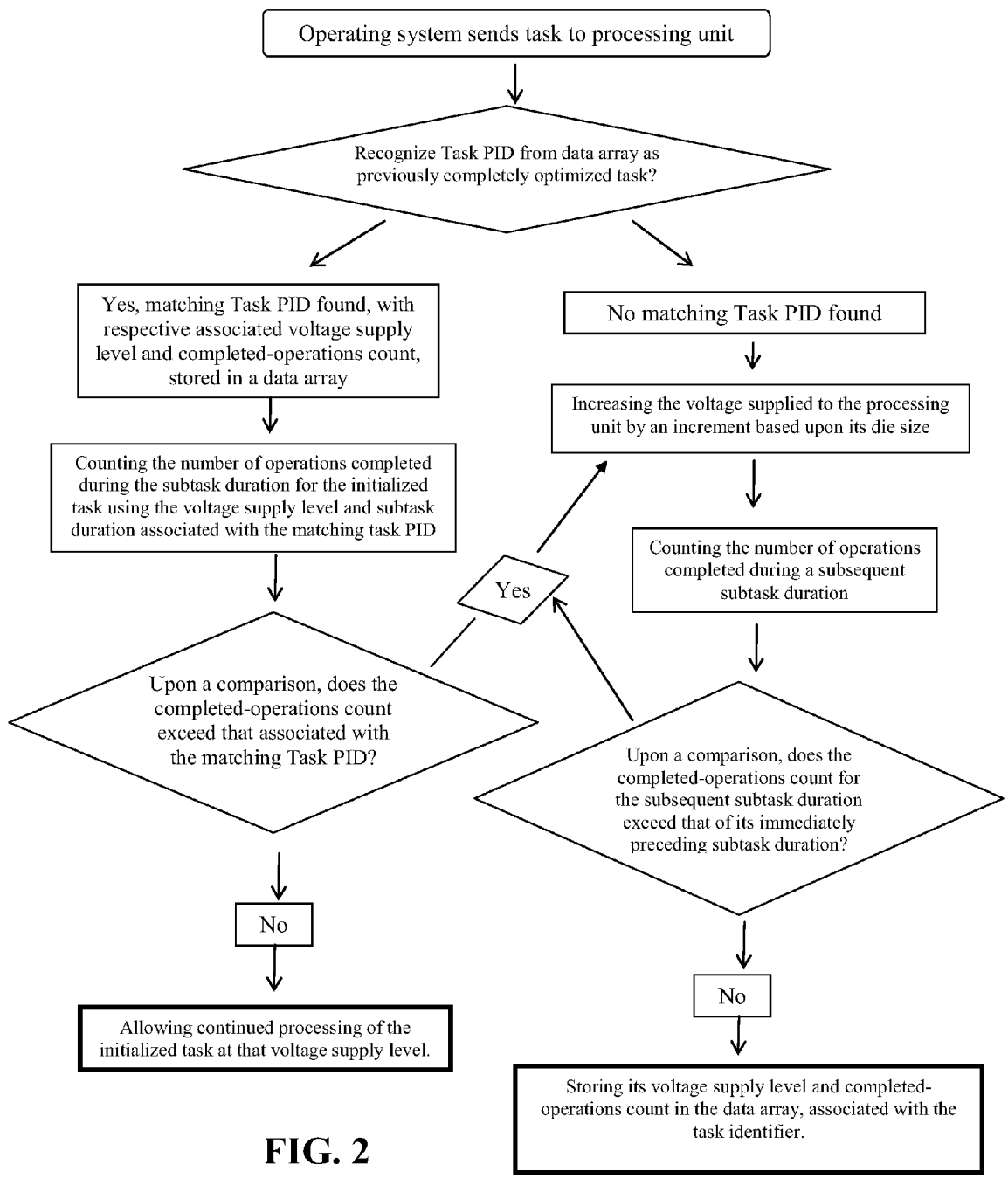
FIG. 2 depicts a logic flow diagram of another version of the program decisionmaking.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The term "optimizer" is used to distinguish the optimizer program operations from those of the program and the processing unit running the task to be optimized.

The term "task" essentially means the program task being optimized, not any task of the optimizer program.

The term "PID" essentially means an identifier unique to a task awaiting processing; after optimizing by the invention disclosed herein, the PID will also be associated with a voltage and completed-operations count.

The term "processing unit" essentially means the processing unit upon which the task is being processed; it may take the form of a single CPU, or functional subunits on that CPU sometimes called the processing "cores".

The term "Process" essentially means the program whose task is being optimized.

The term "exceeds" essentially means to increase (or reflect an increase) above a previous amount or level, either in an absolute sense or by a statistically significant amount such as, for example, the 0.05 level of statistical significance.

The term "equals" essentially means the same as a previous amount or level, either in an absolute sense or having only a de minimis or statistically insignificant amount of difference.

The term "failsafe temperature" essentially means an optimizer-defined temperature (or temperature increment) below the maximum operating temperature recommended by the manufacturer for a processing unit, especially sufficiently below that overheating threshold temperature to adequately safeguard against damage to the processing unit, die or CPU.

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by software media or hardware components, or the construction materials for the same, so long as any structural and/or functional requirements are satisfied. Anything may be used so long as it satisfies the function for which it is being used.

The optimizer program typically runs in the background of the operating system. And although it typically may be installed on the computer containing the processing unit executing the task to be optimized, alternatively it may be run from a network computer, remote web-server or cloud server, disk or flash drive, or other locale remote from computer containing the processing unit executing the task to be optimized.

Each time a new Process task is sent to a processing unit by the operating system, the optimizer counts the number of operations completed during an interval of time that is less than the duration expected to be required to complete the task, and thereby gauges the processing performance of each subtask, eventually noting the optimal voltage level resulting in essentially the highest completed-operations count without overheating the processing unit (by exceeding the failsafe temperature). For a Process task never optimized before, the optimizer typically allows the operating system to execute the Process at the default voltage level for a first subtask duration, counting the number of completed operations during that duration. Then, the optimizer increases the voltage by an increment, preferably dependent upon the die size of the processing unit, then gauges the processing of the next subtask (counting the number of completed Process operations during that duration). As long as the performance improves (subtask completed-operations count increases) when compared to an average or weighted average of previous Process subtasks, the optimizer repeats or loops the incremental increasing of the voltage and gauging of the performance. Once the completed-operations count stops increasing as a result of increasing the voltage to the processing unit, the optimizer stores the optimal power level (with its corresponding PID and completed-operations count) in a data array for previously optimized tasks.

In the future, whenever the optimizer matches a currently-running Process task PID with one for a task previously optimized, the optimizer will direct the operating system to run that task at the voltage level associated with the matching PID while it verifies that the matching PID was for a task that had been completely optimized. If it had been completely optimized (i.e., if the completed-operations count for the subtask duration for the newly initialized Process task is the same as that for the matching PID), the optimizer will allow continued processing at the voltage level associated with the matching PID. If there is a difference in completed-operations counts, the optimizer will resume the optimization for the Process task, starting at the voltage level associated with the matching PID.

More specifically, after activating a Process while the optimizer program is running, the optimization method includes the following steps:

1. Determine whether the current task has previously been optimized, by comparing its PID (in the operating system's PID queue) against the PIDs in the data array maintained for previously-optimized tasks, looking for a matching task PID.

2. If the current task matches a task PID in the data array, count the number of operations completed for the current task during the subtask duration associated with the matching PID, and compare the completed-operations count for the current task against that associated with the matching PID (preferably while monitoring whether the failsafe temperature has been exceeded). If the completed-operations count for the current subtask duration is equal to that associated with the matching PID, discontinue all monitoring except the processing unit temperature. If the completed-operations count for the current subtask duration is different than that associated with the matching PID, re-optimize starting at step 4 below.

3. If the PID for the current task does not match a task PID in the data array, establish a subtask duration for counting the number of operations completed therein during the current task, if no such duration has been pre-set or otherwise established. Also, ascertain the processing unit's die size, for setting an increment amount for voltage adjustment for optimization cycles, and count the number of operations completed during that subtask duration while using the default voltage level.

4. Direct the operating system to incrementally increase the voltage to the processing unit for the task, and count the number of operations completed during a subsequent subtask duration (preferably while monitoring whether the failsafe temperature is exceeded). Preferably, the voltage to the front side bus is increased by the same increment.

5. Compare the completed-operations count of the most recent subtask duration against that of the previous subtask duration. If the count does not exceed (or exceed statistically significantly) that of the previous subtask duration, store it (and the voltage level) in association with the task PID in the data array maintained for previously-optimized tasks. If the completed-operations count for the most recent subtask duration exceeds that of the previous subtask duration, direct the operating system to incrementally increase the voltage to the processing unit for the task, and compare the completed-operations count of the next subtask duration against the average (or weighted average) of the completed-operations counts of the previous subtask durations (preferably while monitoring whether the failsafe temperature is exceeded); repeat along with step 4 until the completed-operations count of the most recent subtask duration no longer exceeds (or until the failsafe temperature is exceeded).

6. Store the task PID and optimized power level if the failsafe temperature is not exceeded during periodic or continuous monitoring the last subtask in the data array maintained for previously-optimized tasks. When the failsafe temperature is exceeded, store the task PID and optimized power level for the immediately preceding subtask in the data array maintained for previously-optimized tasks.

7. Complete the task using the optimized power level.

This invention has many applications. For example, the optimizer could be used to process large or complex database calculations or cross reference large data tables. The optimizer would have most utility when used to optimize the completion of operations for tasks that typically take a relatively long time to complete, such as (for example) genetic sequencing or atomic energy modeling. The optimizer would be especially useful for optimizing programs requiring a multitude of repeated operations. The optimizer would also increase the speed of processing previously optimized tasks by skipping the optimization process for previously optimized tasks, immediately processing the task at the optimal power level. The reduction in time needed to perform analytical processing will greatly expand the types of analysis able to be conducted.

The optimizer does not change or alter the execution of a task during the optimization cycle, but merely calculates and analyzes whether the task's performance has reached its optimal level as judged by the maximal completion of operations without exceeding the failsafe temperature. Preferably, the invention monitors the Process by monitoring the assembly language operations completed during a subtask duration. Preferably, this is accomplished by counting the number of lines of assembly language code completed by the CPU, because each processing operation is essentially defined by a line of assembly language operations code. Each line of such code in numbered, and its completion (primarily evidenced by the start of the next line of code) can be easily accounted for in a RAM data structure without any register within the CPU. This results in the most accurate completed-operations count; merely monitoring count registers or the like is an imprecise gauge of processor activity.

The program disclosed herein also has the ability to concurrently optimize the Processing of several different tasks, each running on a separate processing unit. In multi-core processing environments, the count of the assembly language operations command lines is preferably the sum of all core command line counts; then the optimizer increases power to all cores in the same increment. Alternatively, the program counts the assembly language operations command lines of each core separately, then incrementally increases power to each core independently.

The system includes (comprises):

A. A means of initializing the optimizer;

B. A means of identifying processing unit tasks;

C. a means of determining whether the task has been optimized previously;

D. A means of starting the optimization process for each new task;

E. A means of gauging the speed of processing subtasks;

F. A means of directing adjustment of voltage to the processing unit;

G. A means of determining optimal power level for each task;

H. A means of protecting each processing unit against exceeding the maximum temperature recommended; and I. A means of storing the optimal voltage and completed-operations count in a data array, in association with a PID unique to the respective task, for subsequent recall.

The initializing means for initializing the optimizer is essentially causing the optimizer to execute or run in the background of the computer's operating system, allocating memory to be used by the optimizer, creating a data array within the allocated memory, setting data pointers to beginning positions, pulling the processing unit die size information from the computer's operating system, determining the rate of incremental voltage increase based on the die size of the processing unit, and assigning a processing unit to be used for processing the task.

The identifying means for identifying processing unit tasks is essentially monitoring the operating systems PID queue for new entries, which indicates a new task is waiting to be processed, regardless of whether the task has been previously optimized.

The determining means for determining whether the task has been optimized previously is essentially comparing each new task's PID and searching the data array for a matching PID. If there is no match, the optimizer will continue its optimization process. If there is a match, then the optimizer will set the processing unit voltage to the power level in the data array, then gauge one subtask to ensure processing speed does not increase. If processing unit speed does not increase, the optimizer will set stop optimizing, and the operating system will continue routing the optimal power level to the task. Otherwise, the optimizer will continue the optimization cycle(s). In one embodiment, the power level may remain continuous at the optimal power and performance level as long as the failsafe temperature is not exceeded during the task or process.

The starting means for starting the optimization process for each task is essentially the optimizer finding an available processing unit to process the optimizer's optimization cycle, fetching the default power level set by the computer operating system, and opening channels of communication between the optimizer and the part of the operating system that controls the voltage to the processing units.

The gauging means for gauging the speed of processing subtasks is essentially the counting of the number of operations processed by a processing unit during a set interval of time, and comparing that count against the completed-operations count of the previous subtask duration, or against an average of the counts of all previous durations, or against a weighted average of the counts of all previous subtasks within the same task.

The adjusting means for adjusting voltage to the processing unit is essentially directing the operating system to increase the voltage directed to the processing unit, by an amount based upon the processing unit's physical die size.

The determining means for determining optimal power level for each task essentially compares the operation count for the subtask with the weighted average for the previous operation counts of the previous subtasks. If, despite the increase in voltage, the operation count has not increased from that of the previous subtasks, the voltage setting that produced that count is determined to be the optimal power level for that task.

The protecting means for protecting processing units against exceeding maximum temperatures essentially compares an optimizer-set failsafe temperature against the temperature of the processing unit during the processing of the previous subtask. For example, the failsafe temperature may be set at 3° C. below the manufacturer's recommended maximum temperature for operation without overheating. If the temperature of the processing unit during a subtask exceeds the failsafe temperature, the optimal power level is set to that of the immediately preceding subtask, and the optimizer stops the optimization process.

The storing means for storing the optimal power level and unique task PID in memory is essentially writing the PID and the value of the optimal power level for the processed task in a searchable row within the optimizer's data array. The purpose of storing the optimized power level and associated PID is so that the optimizer can access these values and compare them to future PIDs entering the operating system's PID queue in order to reuse previous analysis rather that redundantly optimizing reoccurring identical tasks.

The invention disclosed herein generally includes a computer-readable program for optimizing the completion of computing operations by a processing unit for an initialized task assigned a task identifier unique thereto. It generally causes the machine to perform processing comprising:

(a) counting the number of operations completed during a subtask duration for the initialized task using the computer's default voltage supply level;

(b) increasing the voltage supplied to the processing unit by an increment, then counting the number of operations completed during a subsequent subtask duration;

(c) comparing the completed-operations count for the subsequent subtask duration against that of the immediately preceding subtask duration;

(d) (1) if the completed-operations count for the subsequent subtask duration does not exceed that of its immediately preceding subtask duration, storing its voltage supply level and completed-operations count in a data array maintained for previously optimized tasks, in association with said task identifier; or (2) if the completed-operations count for said subsequent subtask duration exceeds that of its immediately preceding subtask duration, repeating the processing of 1.(b) and (c) until the completed-operations count for the most recent subtask duration does not exceed that of its immediately preceding subtask duration, then storing its voltage supply level and completed-operations count in said data array in association with the task identifier.

More particularly, the invention may include a program wherein the subtask duration is either pre-set by the program at a pre-determined or default duration such as, for example a duration in the range of between about 1 second and about 20 seconds; a subtask duration in the range of about 10 seconds has been found satisfactory from some Processes. Alternatively, the subtask duration may be selected by the user, either upon installation or initialization of the optimizer program.

Ideally, the subtask duration is for a task expected to take at least 1 minute for completion. Preferably, the tasks to be optimized will be expected to require at least several hours, days or weeks to complete before optimization, rather than tasks only needing a few seconds (or less) to complete. Alternatively, said subtask duration is for a task, the execution of which is expected to require (for completion) memory capacity exceeding that of cache memory available to the processing unit.

The increment of voltage increase may be pre-set at a single amount. For example, for a CPU or die having a recommended operating voltage of between 1.0 and 1.5 volts, the increment of increase may be pre-set at a value between 0.1 volt and 0.001 volt; for example, 0.010 volt. Preferably, the increment of voltage increase is not pre-set by the optimizer program, but is based on the processing unit's die size. More preferably, it is based upon a formula, such as the logarithm of the die size (area, square millimeters), times 0.01 times the default voltage level. $V_{increment} = \log_{10}$ of die size [sq·mm]× 0.01×default voltage. Accordingly, the increment of increase will be tailored to the particular processing unit running the task to be optimized. This may be especially useful in LAN and cloud network environments; a single copy of the optimizer program may be capable of optimizing numerous processing units, possibly on numerous networked computers with a variety of CPUs having different die sizes.

Example 1

A desktop workstation computer having a CPU with a die size of 296 sq. mm, and a power level set by the manufacturer at 1.4V, was used to perform computing analyzing news articles data in investigating key words. Prior to optimization, it took 13.8 minutes to complete the processing. Using the aforementioned formula, the optimizer program increased the voltage by 0.034 V increments, until optimized at 1.57 V; thereafter, the same processing took 1.3 minutes. The manufacturers recommended operating temperature was between 57° C. to 65° C.; the optimizer set the failsafe temperature at 62° C., and it was never exceeded.

Example 2

A 12-core server having processing units with a die size of 346 sq. mm each, and a power level set by the manufacturer at 1.25V, was used to perform computing analyzing gene data in a gene therapy investigation. Prior to optimization, it took 91.2 hours to complete the processing of data for 100 genes. Using the aforementioned formula, the optimizer program increased the voltage by 0.032 V increments, until optimized at 1.538 V; thereafter, the same processing took 17.4 hours. The manufacturers recommended operating temperature was between 55° C. to 64° C.; the optimizer set the failsafe temperature at 62° C., and it was never exceeded.

Another embodiment of the invention disclosed herein includes a program further comprising, prior to performing the aforementioned counting at default level of voltage, determining whether the initialized task has previously been fully optimized by comparing its task identifier against all other task identifiers stored in said data array and, upon finding a match, performing the processing on the initialized task using the voltage supply level and pre-set subtask duration associated with the matching task identifier, counting the number of operations completed during said subtask duration, and comparing the completed-operations count for the subtask duration for the initialized task against the completed-operations count associated with the matching task identifier. And if said completed-operations count for the subtask duration for the initialized task is equal to that associated with the matching task identifier, allowing continued processing of the initialized task at said voltage supply level; but if the completed-operations count for the initialized task is different from that associated with the matching task identifier, resuming said processing after increasing the voltage by the increment. More particularly, the processing may be repeated until the completed-operations count for the most recent subtask duration does not exceed that of the completed-operations counts of its immediately preceding subtask durations, or does not exceed the average (or weighted average) of the completed-operations counts of its immediately preceding subtask durations.

Alternatively, the processing may be repeated until the weighted score for the completed-operations count for the most recent subtask duration does not exceed the intermediate weighted score of the completed-operations count(s) of its immediately preceding subtask duration(s). For example, the weighted score for the operations count of the most recent subtask duration may be equal to the sum of:

(a) the completed operations count for the most recent subtask duration, less the standard deviation of all completed-operations counts (i.e., $COC_{MR}-\sigma_{1toMR}$); plus (b) the sum of the differences between the completed operations counts of each respective intermediate subtask duration and the standard deviation of all subtask durations, then multiplied by 0.1 (i.e., $[(COC_1-\sigma_{1toMR})+(COC_{1+1}-\sigma_{1toMR})+\ldots(COC_{MR-1}-\sigma_{1toMR})]\times 0.1$).

The intermediate weighted score for the operations count of the previous subtask durations may be equal to 1.05 times the sum of the differences between the completed operations counts of each respective intermediate subtask duration and the standard deviation of said counts. The formula would be $1.05\times[(COC_1-\sigma_{1toMR-1})+(COC_{1+1}-\sigma_{1toMR-1})+\ldots(COC_{MR-1}-\sigma_{1toMR-1}]$, where "$COC_1$" means the completed-operations count of the first subtask duration, the subscript "$_{MR}$" means the "most recent" subtask duration, and "$(COC_{1+1}-\sigma_{1toMR-1})+\ldots(COC_{MR-1}-\sigma_{1toMR-1})$" means the completed-operations count(s) of all durations except the first and the most recent.

One preferred embodiment of such scoring is to make the score-value of the immediately preceding subtask durations the sum of weighted subvalues for each subtask duration. For example, if three optimization cycles have run, assume the completed-operations count for the first subtask duration is 100, and the count for the second duration is 150; the mean is 125, and the standard deviation (u) is 35.356. The following formula may be applied to calculate the intermediate weighted score of subtask durations 1 and 2:

$$\text{intermediate weighted score}_{1-2}=1.05[(100-\sigma_{1-2})+(150-\sigma_{1-2}]=188.254$$

Assuming the completed-operations count for the third duration is 200, so that the mean becomes 150 (and the standard deviation becomes 50), the following formula may be applied to calculate the weighted score for subtask durations 1 through 3 (for comparison against the intermediate weighted score of subtask durations 1 and 2):

$$\text{weighted score}_{1-3}=0.1[(100-\sigma_{1-3})+(150-\sigma_{1-3})]+(200-\sigma_{1-3})=179.289$$

Since the weighted score of the completed-operations count for the most recent subtask duration (179.289) does not exceed the intermediate weighted score of its previous subtask durations (188.254), no further optimization cycles will occur. In this manner, the invention will continue optimizing the voltage supply level so long as the most recent completed-operations count increased a statistically significant amount, such as (for example) at the 5% level of significance. In order for optimization cycles to continue, the third count must be 262 or greater.

For example, if the count for the third duration is 265; the mean becomes 203.75, and the standard deviation becomes 94.285. Accordingly, the weighted score for the third duration is:

$$\text{weighted score}_{1-3}=0.1[(100-\sigma_{1-3})+(150-\sigma_{1-3})]+(265-\sigma_{1-3})=188.472$$

Since that weighted score (188.472) exceeds the intermediate weighted score of its previous subtask durations (188.254), a fourth optimization cycle would occur.

Assuming the completed-operations count for the fourth duration is 300, so that the mean becomes 171.667 (and the standard deviation becomes 84.607), the intermediate weighted score of subtask durations 1 though 3 is:

$$\text{intermediate weighted score}_{1-3}=1.05[(100-\sigma_{1-3})+(150-\sigma_{1-3})+(265-\sigma_{1-3})]=274.238$$

The weighted score for subtask durations 1 through 4 (for comparison against the intermediate weighted score of subtask durations 1 though 3) is:

$$\text{weighted score}_{1-4}=0.1[(100-\sigma_{1-4})+(150-_{1-4})+(265-\sigma_{1-4})]+(300-\sigma_{1-4})=228.93$$

Accordingly, since the weighted score of completed operations count for the most recent subtask duration (228.93) does not exceed the intermediate weighted score of its previous subtask durations (274.238), no further optimization cycle would occur.

The invention disclosed herein may include program code also causing the machine to perform processing of continuously comparing the temperature of the processing unit against that of a temperature threshold below that manifesting overheating of the processing unit and, when said threshold is exceeded, discontinuing said optimizing and storing the voltage supply level and completed-operations count for the most recent subtask duration not exceeding said threshold, in said data array and in association with said task identifier.

One detailed embodiment of the invention includes computer-readable program for optimizing the completion of computing operations by a processing unit for an initialized task assigned a task identifier unique thereto, by causing the computer to perform processing comprising:

(a) determining whether the initialized task has previously been fully optimized by comparing its task identifier against each other task identifier, with respective associated voltage supply level and completed-operations count, stored in a data array maintained for previously optimized tasks, and, if no match is found;

(b) increasing the voltage supplied to the processing unit by an increment based upon its die size, then counting the number of operations completed during a subsequent subtask duration;

(c) comparing the completed-operations count for the subsequent subtask duration against that of the immediately preceding subtask duration; and (1) if the completed-operations count for the subsequent subtask duration does not exceed that of its immediately preceding subtask duration, storing its voltage supply level and completed-operations count in said data array, associated with said task identifier; or (2) if the completed-operations count for the subsequent subtask duration exceeds that of its immediately preceding subtask duration, repeating processing of (b) and (c) until the completed-operations count for the most recent subtask duration does not exceed that of its immediately preceding subtask duration, then storing its voltage supply level and completed-operations count in said data array in association with said task identifier; but (d) if a match is found, counting the number of operations completed during a subtask duration for the initialized task using the voltage supply level and subtask duration associated with the matching task identifier, and comparing said completed-operations count against that associated with the matching task identifier, and;

(1) if said completed-operations count for the subtask duration for the initialized task does not exceed that associated with the matching task identifier, allowing continued processing of the initialized task at said voltage supply level; or (2) if the completed-operations count for the subtask duration for the initialized task exceeds that associated with the matching task identifier, repeating processing of (b) and (c) until the completed-operations count for the most recent subtask duration does not exceed that of its immediately preceding subtask duration, then storing its voltage supply level and completed-operations count in said data array in association with said task identifier.

Preferably, said programming causes the machine to perform processing further comprising comparing the temperature of the processing unit against a failsafe temperature threshold below the temperature manifesting overheating of the processing unit and, when said failsafe threshold is exceeded, discontinuing said optimizing and storing the voltage supply level and completed-operations count for the most recent subtask duration not exceeding said failsafe threshold, in said data array and in association with said task identifier, and wherein:

(a) said subtask duration is about 10 seconds;

(b) said increment of voltage increase is determined by the formula $V_{increment} = \log_{10}$ of die size [sq·mm]×0.01×default voltage; and (c) in performing any of the processing of immediately preceding (c)(2) and (d)(2), the processing of aforementioned (b) and (c) is repeated until a weighted score for the completed-operations count for the most recent subtask duration does not exceed an intermediate weighted score for the completed-operations count for immediately preceding subtask durations.

Besides the computer software programming and related media disclosed herein, the invention includes a method of optimizing the completion of computing operations by a processing unit for an initialized task assigned a task identifier unique thereto, comprising the steps of:

(a) counting the number of operations completed during a subtask duration for the initialized task using the computer's default voltage supply level;

(b) increasing the voltage supplied to the processing unit by an increment, then counting the number of operations completed during a subsequent subtask duration;

(c) comparing the completed-operations count for the subsequent subtask duration against that of the immediately preceding subtask duration; and (d) (1) if the completed-operations count for the subsequent subtask duration does not exceed that of its immediately preceding subtask duration, storing its voltage supply level and completed-operations count in a data array maintained for previously optimized tasks, in association with said task identifier; or (2) if the completed-operations count for said subsequent subtask duration exceeds that of its immediately preceding subtask duration, repeating steps (b) and (c) until the completed-operations count for the most recent subtask duration does not exceed that of its immediately preceding subtask duration, then storing its voltage supply level and completed-operations count in said data array in association with the task identifier.

Preferably, the invention includes a method further comprising the steps of:

(a) prior to performing the processing of immediately preceding (a), determining whether the initialized task has previously been fully optimized by comparing its task identifier against all other task identifiers stored in said data array and, upon finding a match, performing the processing of immediately preceding (a) on the initialized task using the voltage supply level and subtask duration associated with the matching task identifier, counting the number of operations completed during said subtask duration, and comparing the completed-operations count for the subtask duration for the initialized task against the completed-operations count associated with the matching task identifier; and if said completed-operations count for the subtask duration for the initialized task is equal to that associated with the matching task identifier, allowing continued processing of the initialized task at said voltage supply level, but if the completed-operations count for the initialized task is different from that associated with the matching task identifier, resuming said processing at immediately preceding (b); and (b) comparing the temperature of the processing unit against a failsafe temperature threshold below the temperature manifesting overheating of the processing unit and, when said failsafe threshold is exceeded, discontinuing said optimizing and storing the voltage supply level and completed-operations count for the most recent subtask duration not exceeding said failsafe threshold, in said data array and in association with said task identifier.

More particularly, the invention includes a method wherein:

(a) said increment of voltage increase is determined by the formula $V_{increment} = \log_{10}$ of die size [sq·mm]×0.01×default voltage; and in performing any of the processing of aforementioned (d)(2), the processing steps of aforementioned (b) and (c) are repeated until a weighted score for the completed-operations count for the most recent subtask duration does not exceed an intermediate weighted score for the completed-operations count for immediately preceding subtask durations.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A computer-readable program stored in a physical medium for optimizing the completion of computing operations by a processing unit for an initialized task assigned a task identifier unique thereto, by causing the machine to perform processing comprising:
   (a) counting the number of operations completed during a subtask duration for the initialized task using the computer's default voltage supply level;
   (b) increasing the voltage supplied to the processing unit by an increment, then counting the number of operations completed during a subsequent subtask duration;
   (c) comparing the completed-operations count for the subsequent subtask duration against that of the immediately preceding subtask duration;
   (d) (1) if the completed-operations count for the subsequent subtask duration does not exceed that of its immediately preceding subtask duration, storing its voltage supply level and completed-operations count in a data array maintained for previously optimized tasks, in association with said task identifier; or
   (2) if the completed-operations count for said subsequent subtask duration exceeds that of its immediately preceding subtask duration, repeating the processing of 1.(b) and (c) until the completed-operations count for the most recent subtask duration does not exceed that of its immediately preceding subtask duration, then storing its voltage supply level and completed-operations count in said data array in association with the task identifier.

2. The program described in claim 1, wherein said subtask duration is a pre-set duration in the range of between about 1 second and about 20 seconds.

3. The program described in claim 1, wherein said subtask duration is about 10 seconds.

4. The program described in claim 1, wherein said subtask duration is determined by the computer user.

5. The program described in claim 1, wherein said subtask duration is for a task expected to require at least about 1 minute for completion.

6. The program described in claim 1, wherein said subtask duration is for a task, the execution of which is expected to require, for completion, memory capacity exceeding that of cache memory available to the processing unit.

7. The program described in claim 1, wherein said increment of voltage increase is based on the die size of the CPU upon which the processing unit is located.

8. The program described in claim 7, wherein said increment of voltage increase is determined by the formula $V_{increment} = \log_{10}$ of die size [sq·mm]×0.01×default voltage.

9. The program described in claim 7, wherein said increment of voltage increase is a fraction in the range of between about one-tenth ($1/10^{th}$) and about one-thousandth ($1/1000^{th}$) of the computer's default voltage supply level.

10. The program described in claim 1, further comprising, prior to performing the processing of 1.(a), determining whether the initialized task has previously been fully optimized by comparing its task identifier against all other task identifiers stored in said data array and, upon finding a match, performing the processing of 1.(a) on the initialized task using the voltage supply level and subtask duration associated with the matching task identifier, counting the number of operations completed during said subtask duration, and comparing the completed-operations count for the subtask duration for the initialized task against the completed-operations count associated with the matching task identifier; and if said completed-operations count for the subtask duration for the initialized task is equal to that associated with the matching task identifier, allowing continued processing of the initialized task at said voltage supply level, but if the completed-operations count for the initialized task is different from that associated with the matching task identifier, resuming said processing at 1.(b).

11. The program described in claim 1 wherein, in performing any of the processing of 1.(d)(2), the processing of 1.(b) and (c) is repeated until the completed-operations count for the most recent subtask duration does not exceed the average of the completed-operations counts of its immediately preceding subtask durations.

12. The program described in claim 1 wherein, in performing any of the processing of 1.(d)(2), the processing of 1.(b) and (c) is repeated until a weighted score for the completed-operations count for the most recent subtask duration does not exceed an intermediate weighted score for the completed-operations count for immediately preceding subtask durations.

13. The program described in claim 12 wherein said intermediate weighted score is calculated according to formula (a) hereinbelow and said weighted score is calculated according to formula (b) below, namely:

$$1.05 \times [(COC_1 - \sigma_{1toMR-1}) + (COC_{1+1}\sigma_{1toMR-1}) + \ldots (COC_{MR-1} - \sigma_{1toMR-1})] \quad (a)$$

$$(COC_{MR} - \sigma_{1toMR}) + [(COC_1 - \sigma_{1toMR}) + (COC_{1+1} - \sigma_{1toMR}) + \ldots (COC_{MR-1} - \sigma_{1toMR})] \times 0.1. \quad (b)$$

14. A program described in claim 1, also causing the machine to perform processing further comprising comparing the temperature of the processing unit against a failsafe temperature threshold below the temperature manifesting overheating of the processing unit and, when said failsafe threshold is exceeded, discontinuing said optimizing and storing the voltage supply level and completed-operations count for the most recent subtask duration not exceeding said failsafe threshold, in said data array and in association with said task identifier.

15. A computer-readable program stored in a physical medium for optimizing the completion of computing operations by a processing unit for an initialized task assigned a task identifier unique thereto, by causing the computer to perform processing comprising:
   (a) determining whether the initialized task has previously been fully optimized by comparing its task identifier against each other task identifier, with respective associated voltage supply level and completed-operations count, stored in a data array maintained for previously optimized tasks, and, if no match is found;
   (b) increasing the voltage supplied to the processing unit by an increment based upon its die size, then counting the number of operations completed during a subsequent subtask duration;
   (c) comparing the completed-operations count for the subsequent subtask duration against that of the immediately preceding subtask duration; and
   (1) if the completed-operations count for the subsequent subtask duration does not exceed that of its immediately preceding subtask duration, storing its voltage supply level and completed-operations count in said data array, associated with said task identifier; or (2) if the completed-operations count for the subsequent subtask duration exceeds that of its immediately preceding subtask duration, repeating processing of 15.(b) and (c) until the completed-operations count for the most recent subtask duration does not exceed that of its immediately preceding subtask duration, then storing its voltage supply level and completed-operations count in said data array in association with said task identifier; but (d) if a match is found, counting the number of operations completed during a subtask duration for the initialized task using the voltage supply level and subtask duration associated with the matching task identifier, and comparing said completed-operations count against that associated with the matching task identifier, and;

(1) if said completed-operations count for the subtask duration for the initialized task does not exceed that associated with the matching task identifier, allowing continued processing of the initialized task at said voltage supply level; or (2) if the completed-operations count for the subtask duration for the initialized task exceeds that associated with the matching task identifier, repeating processing of 15.(b) and (c) until the completed-operations count for the most recent subtask duration does not exceed that of its immediately preceding subtask duration, then storing its voltage supply level and completed-operations count in said data array in association with said task identifier.

16. The program described in claim 15, said programming causing the machine to perform processing further comprising comparing the temperature of the processing unit against a failsafe temperature threshold below the temperature manifesting overheating of the processing unit and, when said failsafe threshold is exceeded, discontinuing said optimizing and storing the voltage supply level and completed-operations count for the most recent subtask duration not exceeding said failsafe threshold, in said data array and in association with said task identifier, and wherein:

(a) said subtask duration is about 10 seconds;

(b) said increment of voltage increase is determined by the formula $V_{increment}=\log_{10}$ of die size [sq·mm]×0.01×default voltage; and (c) in performing any of the processing of 15.(c)(2) and (d)(2), the processing of 15.(b) and (c) is repeated until a weighted score for the completed-operations count for the most recent subtask duration does not exceed an intermediate weighted score for the completed-operations count for immediately preceding subtask durations.

17. A method of optimizing the completion of computing operations by a processing unit for an initialized task assigned a task identifier unique thereto, comprising the steps of:

(a) counting the number of operations completed during a subtask duration for the initialized task using the computer's default voltage supply level;

(b) increasing the voltage supplied to the processing unit by an increment, then counting the number of operations completed during a subsequent subtask duration;

(c) comparing the completed-operations count for the subsequent subtask duration against that of the immediately preceding subtask duration; and (d) (1) if the completed-operations count for the subsequent subtask duration does not exceed that of its immediately preceding subtask duration, storing its voltage supply level and completed-operations count in a data array maintained for previously optimized tasks, in association with said task identifier; or (2) if the completed-operations count for said subsequent subtask duration exceeds that of its immediately preceding subtask duration, repeating steps 17.(b) and (c) until the completed-operations count for the most recent subtask duration does not exceed that of its immediately preceding subtask duration, then storing its voltage supply level and completed-operations count in said data array in association with the task identifier.

18. The method described in claim 17, further comprising the steps of:

(a) prior to performing the processing of 17.(a), determining whether the initialized task has previously been fully optimized by comparing its task identifier against all other task identifiers stored in said data array and, upon finding a match, performing the processing of 17.(a) on the initialized task using the voltage supply level and subtask duration associated with the matching task identifier, counting the number of operations completed during said subtask duration, and comparing the completed-operations count for the subtask duration for the initialized task against the completed-operations count associated with the matching task identifier; and if said completed-operations count for the subtask duration for the initialized task is equal to that associated with the matching task identifier, allowing continued processing of the initialized task at said voltage supply level, but if the completed-operations count for the initialized task is different from that associated with the matching task identifier, resuming said processing at 17.(b); and (b) comparing the temperature of the processing unit against a failsafe temperature threshold below the temperature manifesting overheating of the processing unit and, when said failsafe threshold is exceeded, discontinuing said optimizing and storing the voltage supply level and completed-operations count for the most recent subtask duration not exceeding said failsafe threshold, in said data array and in association with said task identifier.

19. The method described in claim 18, wherein:

(a) said increment of voltage increase is determined by the formula $V_{increment}=\log_{10}$ of die size [sq·mm]×0.01×default voltage; and (b) in performing any of the processing of 17.(d)(2), the processing steps of 17.(b) and (c) are repeated until a weighted score for the completed-operations count for the most recent subtask duration does not exceed an intermediate weighted score for the completed-operations counts for immediately preceding subtask durations.

\* \* \* \* \*